United States Patent [19]

Carminati

[11] Patent Number: 4,538,332
[45] Date of Patent: Sep. 3, 1985

[54] METHOD FOR THREADING SPOKES ON A SPOKE WHEEL HUB

[75] Inventor: Julien Carminati, Annecy-le-Vieux, France

[73] Assignee: Centre de Production Mecanique, Epagny, France

[21] Appl. No.: 474,598

[22] PCT Filed: Jun. 17, 1982

[86] PCT No.: PCT/FR82/00099
 § 371 Date: Feb. 18, 1983
 § 102(e) Date: Feb. 18, 1983

[87] PCT Pub. No.: WO82/04421
 PCT Pub. Date: Dec. 23, 1982

[30] Foreign Application Priority Data
 Jun. 19, 1981 [FR] France .................. 81 12561

[51] Int. Cl.³ .................................. B21F 39/00
[52] U.S. Cl. .................... 29/159.02; 29/429; 301/74
[58] Field of Search ........... 29/159.02, 159.01, 159.03, 29/159 R, 159.1, 802, 429, 433, 241; 301/74, 80, 104

[56] References Cited

U.S. PATENT DOCUMENTS

| 1,801,271 | 4/1931 | Heider | 29/159.02 |
| 3,606,474 | 9/1971 | Meiklejohn | 29/159.02 |
| 3,711,916 | 1/1973 | Meiklejohn | 29/159.02 |

FOREIGN PATENT DOCUMENTS

| 2027788 | 12/1970 | Fed. Rep. of Germany | 29/159 R |
| 2355174 | 5/1974 | Fed. Rep. of Germany | 29/159.02 |

Primary Examiner—Howard N. Goldberg
Assistant Examiner—P. W. Echols
Attorney, Agent, or Firm—Roland Plottel

[57] ABSTRACT

The invention relates to a brake support (2) holding a hub (3) in a substantially horizontal position, a positioning head (12) and spoke feed and guide members (40,42,44,46). The position of the holes of the hub is detected by a positioning needle (9), lowered under the action of a jack (14) and being inserted into one of the holes to bring it into a predetermined position. The needle is then withdrawn for threading the spokes.

The invention applies to methods for automatically threading spokes of spoke wheels.

5 Claims, 9 Drawing Figures

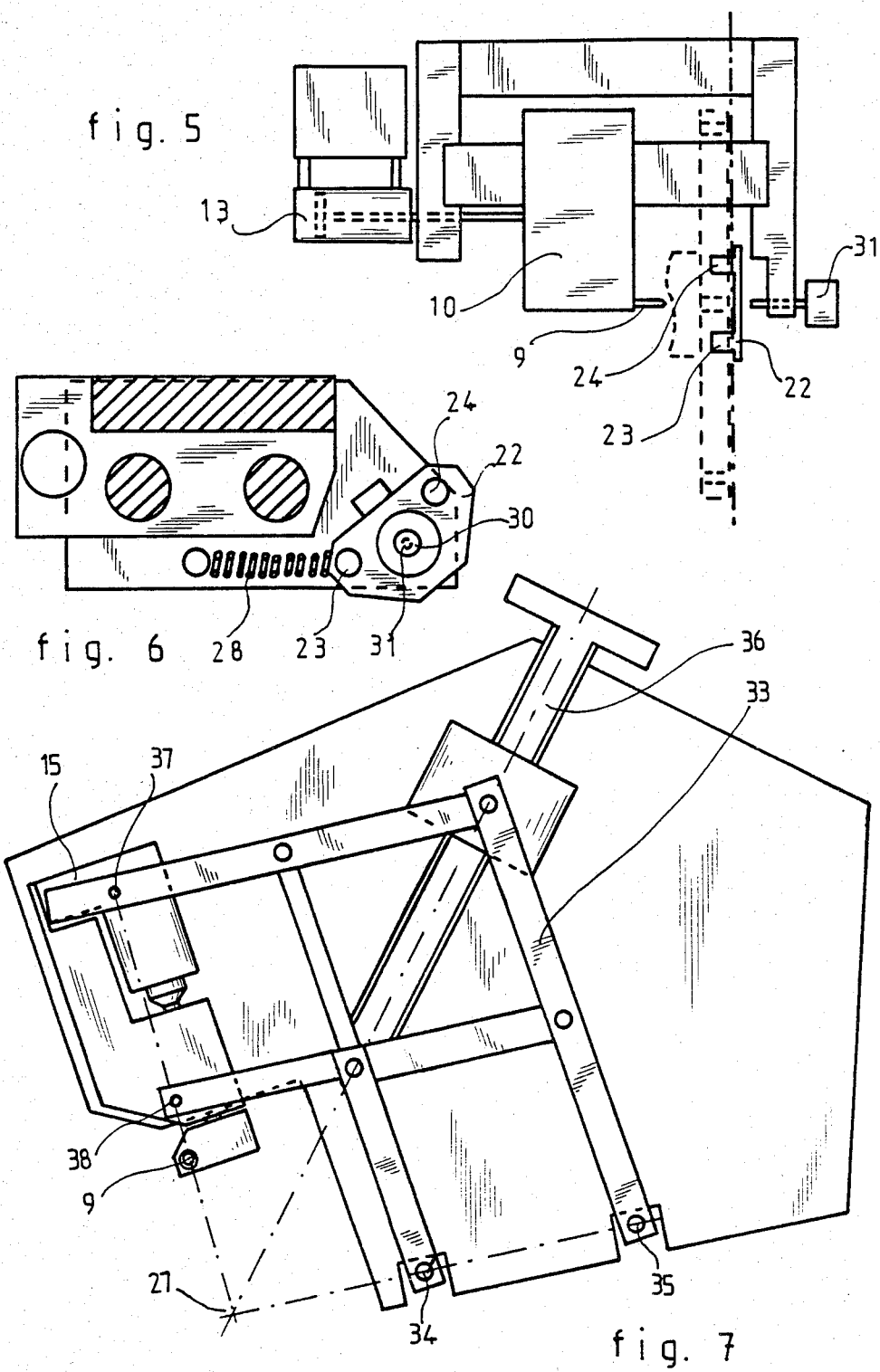

METHOD FOR THREADING SPOKES ON A SPOKE WHEEL HUB

The present invention relates to a method and device for introducing spokes into the holes provided in the flanges of wheel hubs, particularly for bicycles.

Spoke wheel hubs generally comprise a central cylindrical shaft, limited at both ends by two perpendicular flanges comprising a ring of holes for receiving the ends of the spokes connecting the hub to the rim of the wheel. In the ring of holes, the free legs of the spokes are introduced alternately from the outside and from the inside.

The introduction of spokes into the rings of holes has been done up to now by hand. For that, the hub was fixed along a vertical axis, then the spokes were introduced from the top into one hole out of two in the upper and lower flanges; then the half spoked hub was rotated through one hundred and eighty degrees for introducing, again from the top, the spokes into the remaining holes. This work required much time and skill and it could happen that the spokes got tangled up during the one hundred and eighty degree rotation.

The present invention has more especially as object to obviate the disadvantages of known methods by proposing a new method for modifying the introduction of the spokes into the rings of holes of the hubs, this method allowing this work to be carried out automatically and speedily.

Another object of the invention is to propose a device for implementing this method, which is particularly efficient and inexpensive.

Another object of the invention is to propose such a device which allows spokes to be threaded on hubs of different sizes and having different numbers of holes.

Another object of the invention is to propose a device for threading spokes on to hubs having boring defects, and more particularly misalignment of the holes formed in the two flanges.

For this, and according to one feature of the invention, the hub is disposed horizontally and its rotation is controlled by drive means allowing a braking torque to be provided greater than the drive torque produced by the weight of the spokes mounted on the hub; the hub is rotated so as to bring it into a predetermined position; two consecutive spokes are threaded into the corresponding holes of each flange in predetermined directions so that they pass to one side of the other flange and, after introduction, the spokes are left to hang under the action of their own weight; then the hub is rotated to bring into the predetermined position the first free hole preceding the holes filled with spokes; the threading of the spokes and rotation of the hub are continued until all the spokes are introduced and the hub is withdrawn. This method avoids having to rotate the half spoked hub through one hundred and eighty degrees. Furthermore, the rings of holes in the two flanges are provided with spokes at the same time and in a given order and position, so that the spokes do not get entangled with each other and the method may be automated.

According to another feature of the invention, during threading, the spokes are introduced in a descending zone of the hub on the same side with respect to the vertical passing through the axis of the hub and into the holes disposed above holes possibly filled with spokes, so that after threading the spokes are piled up above each other under the action of their weight.

According to another feature of the invention, during the threading step, the lower spoke is introduced first of all then the upper spoke of a first flange, then the lower spoke and the upper spoke of the second flange, so as to allow piling up of the spokes under the effect of their own weight, to avoid crossing of the spokes and of the devices ensuring the threading.

According to another feature of the invention, the device for implementing the method comprises a support associated with braking means for holding a hub in a horizontal position, drive means for imparting a rotational movement of the hub to a predetermined angular position; means for threading spokes into each of the flanges, presenting these spokes in succession in a substantially horizontal position, slightly slanting so as to pass to the side of the other flange, the curved head of the spokes being turned to one side to allow rotation of the spoke under the effect of its own weight after introduction.

In a first embodiment, the positioning of the hub is provided by means of a needle penetrating into a hole of the hub; that allows this hole to be brought into an accurately known position, so that the introduction of the spokes may take place without having to search for the position of the holes. The predetermined position of the first hole is fixed by the mechanical limiting position of the needle.

According to another feature of the invention, the positioning needle is mounted on a mobile positioning head driven by a first jack, along a path passing in front of the spoke holes, between a first position in which the needle is moved away from the hub to allow the spokes to be introduced and a second position in which the needle is opposite the spoke holes for insertion into the first spoke hole by drive means; the positioning head may further oscillate in a plane perpendicular to the shaft of the hub between a first position in which the movement of the head in the direction of the hub is limited by stop means, and a second position in which the head moves away from the hub, resilient means returning the head in the direction of the first position. Actuation of the positioning needle is thus provided by particularly economical means, and more especially less expensive than driving and positioning the hub by rotational actuation of its shaft.

According to a second embodiment, driving, holding and braking the hub are ensured by two free-running parallel horizontal lower rollers, on which the central shaft of the hub may rest, and two upper drive rollers coated with a non-skid material each bearing on one of the flanges. The drive rollers are subjected to the action of drive means and braking means associated with angular positioning detection means, and are mounted on a carriage actuated vertically by a jack. With this device, seeking the holes at each spoke insertion is made simple. Furthermore, rotation of the hub may be carried out during the translational movements of the devices for guiding the spokes. The predetermined position, that is to say the position in which the first spoke may be inserted into tho hole, is detected by the spoke itself, pushed against the flange until it is introduced into the hole.

According to another feature of the invention, the lower rollers are mounted on a carriage movable in translation in a transverse direction substantially parallel to the mean bisecting plane of the spoke introduction zone, urged by a jack associated with position detecting means. With this device, in association with rotation of the hub, the holes may be easily and simply sought in an area around the position of a spoke.

Other features and advantages of the present invention will be clear from the following description of a particular embodiment made with reference to the accompanying figures in which:

FIG. 5 shows the constructional detail in a front view of the positioning head;

FIG. 6 shows a side view in partial section of the positioning head showing more especially the oscillating stop;

FIG. 7 shows the means for adjusting the path of the positioning needle;

Figure 1:
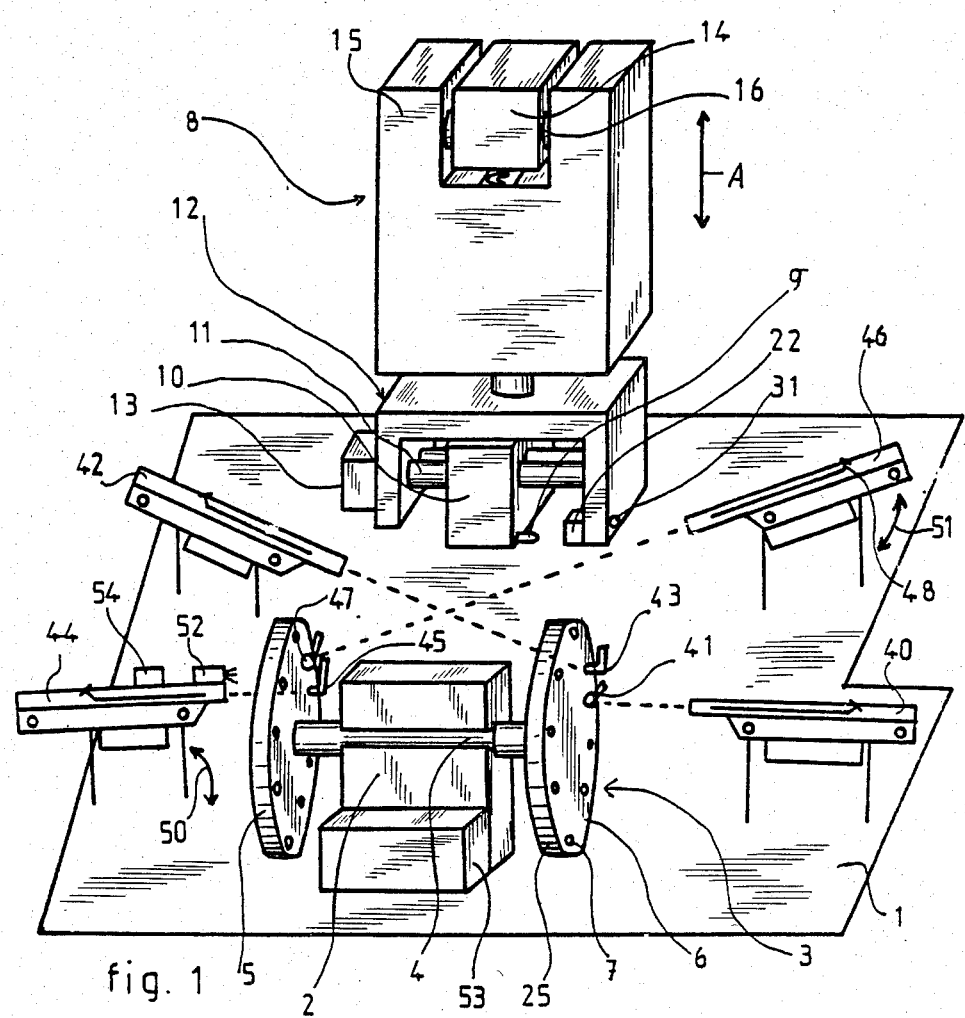
FIG. 1 shows schematically a perspective view of the device of the present invention according to a first embodiment.

In the embodiment of FIG. 1, the device of the present invention comprises, mounted on a fixed frame 1, a brake support 2 for positioning the hub horizontally. Hub 3 comprises a central cylindrical shaft 4 limited at each end by flanges 5 and 6. Each of the flanges comprises a ring of holes 7 into which the spokes are to be threaded. As the threading of the spokes progresses, the weight of these spokes produces a torque tending to cause the hub to rotate about its shaft. The braking torque of brake support 2 is determined so as to prevent rotation of the hub under the action of the weight of the spokes, but to allow rotation of this hub under the action of a positioning device 8. The positioning device comprises a positioning needle 9 integral with a carriage 10 movable in translation in a direction substantially parallel to shaft 4 of the hub. Carriage 10 is mounted on transverse guide means 11 integral with a positioning head 12, and is urged in translation by a jack 13, or second jack, imparting to needle 9 a translational movement parallel to the shaft of the hub, between a first position in which the needle passes through the plane defined by one of the flanges of the hub, to penetrate possibly into a hole 7 of the hub, and a second retracted position where the needle escapes from the planes of the flanges.

The positioning head 12 is movable in translation, as shown by the double arrow A, along a path allowing the needle 9 to be brought close to the holes 7 of the right-hand flange 6 of the hub. The translational movement is imparted thereto by a jack 14 pivotably mounted on a support 15 integral with the fixed frame 1. The pivoting jack 14, or first jack, drives the positioning head 12 between a first position shown in FIG. 1, in which the needle is moved away from the hub to allow introduction of the spokes, and a second position in which the needle is facing the spoke holes 7 for insertion therein.

Figures 3, 4:
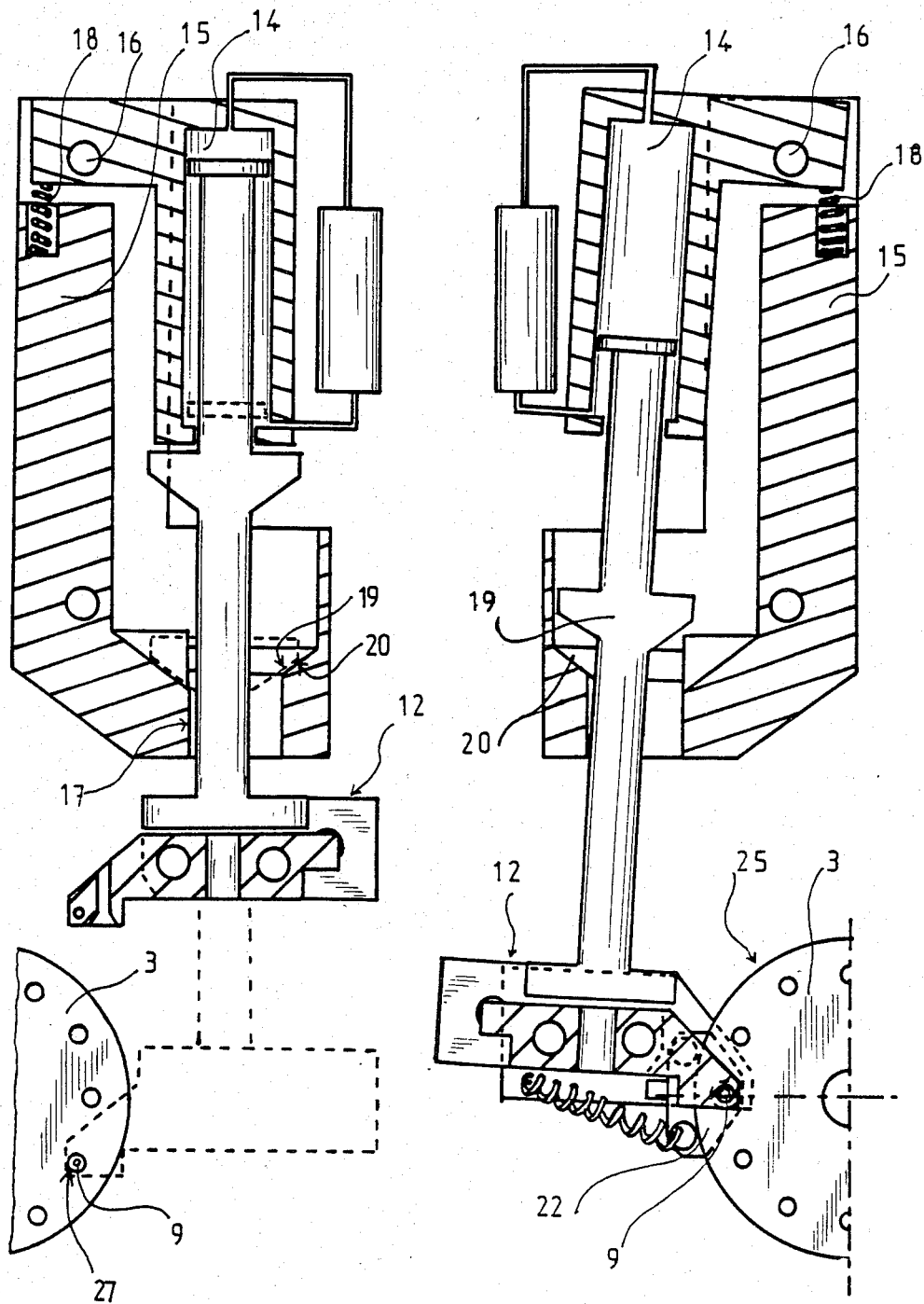
FIG. 3 shows a sectional view of the right-hand side of the device for actuating the positioning needle in the position where the needle frees the hub and in the endmost position.
FIG. 4 shows a sectional view of the left-hand side of the device for actuating the positioning needle in an intermediate position.

As shown in FIGS. 3 and 4, the jack 14 is double-acting so as to allow movement of the positioning head in both directions. This jack is mounted so as to oscillate or swing about a rotational shaft 16 parallel to shaft 4 of the hub, so that the positioning head 12 may oscillate in a plane perpendicular to the shaft of the hub between a first position, shown in FIG. 3, in which the jack 14 is applied slidingly against a face 17 of support 15 forming a stop, and a second position shown in FIG. 4, in which the direction of the jack 14 is further removed from the hub. A spring 18 returns the jack-positioning head assembly to the first position, in which the direction of the jack passes the closest to hub 3.

Under the action of jack 14, the positioning head 12 is lowered in the direction of the hub, as shown in FIG. 4; at the end of travel, a cone 19, integral with the rod of jack 14, engages in a corresponding conical housing 20 in support 15 as shown with a broken line in FIG. 3. In this end of travel position, oscillation of the jack and of the positioning head 12 is prevented, so that the position of needle 9 is accurately known.

Figure 2:
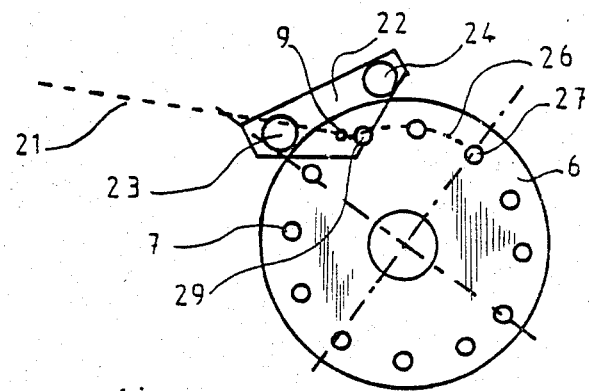
FIG. 2 is for illustrating the relative movement of the positioning needle and of the hub.

FIG. 2 illustrates the path followed by the needle during the thrust of jack 14. This path comprises first of all a rectilinear portion 21 until the needle reaches the zone of the holes of the hub. To prevent the path continuing in a straight line, particularly if the rectilinear portion 21 passes between two holes, the device comprises means for bending this path and causing the needle to travel over the circular ring comprising the holes. For that, the positioning head 12 comprises an oscillating stop 22, shown more especially in FIGS. 5 and 6, provided with two studs 23 and 24. The oscillating stop 22 pivots about a shaft disposed in the extension of needle 9, and studs 23 and 24 are disposed so that, when the positioning head 12 is lowered against a hub, with studs 23 and 24 bearing against the edge 25 of flange 6, the axis of stop 22 is maintained opposite the circular ring comprising the holes of the flange. Thus, as soon as studs 23 and 24 touch the flange, needle 9 follows a circular path 26 until it reaches the endmost position 27 in which cone 19 is blocked in housing 20. Stop 22 is brought back to a waiting position by a spring 28 when the positioning head is raised.

To allow the introduction of needle 9 into the first hole 29, shown in FIG. 2, which occurs on the curvilinear path, the device comprises means for detecting the presence of this hole opposite the needle. In the embodiment shown in the figures, these means comprise an aperture 30 formed in the axis of rotation of stop 22, and in which is engaged an optical cell 31 detecting the presence of a hole in the flange when this latter is opposite the aperture. The cell, when a hole is detected, produces a signal which causes actuation of jack 13 for introducing needle 9 into the hole. The accuracy of the optical system may be relatively low since the needle, because of its pointed shape, allows the positional adjustment to be improved by its penetration into the hole from the moment when its point reaches at least the edge of the hole.

For constructing a device operating with hubs 3 having a different number of holes, the present invention provides means for adjusting the direction of path 21 of the needle in a range of about 30 degrees. To facilitate the adjustments, it is preferable to provide a path always passing through the same endmost position 27 of the needle, shown in FIG. 7. Thus, a deformable frame 33 is used, formed of deformable parallelograms, two sides of which oscillate about fixed points 34 and 35. Fixed points 34 and 35 are aligned with the endmost position 27 of the needle, and deformation of the parallelograms is obtained by an adjusting screw 36. Screw 36 is disposed along a diagonal of one of the parallelograms and in a direction passing through position 27, whereas support 15 is firmly fixed to the parallelogram along two axes of rotation 37 and 38 aligned with the endmost position 27.

In FIG. 1 there is shown schematically and on a smaller scale four spoke feed and guide devices disposed on each side of the hub for inserting the spokes into the holes. A first guide device 40 allows a spoke to be inserted in a direction passing through a first hole 41 in the right-hand flange 6. This first hole 41 may be the hole in which needle 9 was introduced during positioning of the hub. A second guide device 42 allows the spoke to be inserted into the immediately upper hole 43 of flange 6, whereas a third guide means 44 allows a spoke to be inserted into the hole 45 of the left-hand flange 5 situated opposite the first hole 41 and a fourth guide means 46 allows a spoke to be inserted into hole 47 immediately above hole 45. Guide means 40, 42, 44 and 46 are integral with the fixed frame 1, and their direction does not need to be changed during filling of a hub. On the other hand, it is necessary to provide guide means not hindering the movement of the positioning head 12 during positioning of the hub. Thus, guide means may be provided disposed on slides and actuated by jacks for bringing them close to the hub during threading of the spokes and to move them away during positioning of the hub.

To allow even piling up of the spokes, the spoke feed and guide devices present the spokes in four directions slanting with respect to shaft 4 of the hub by an angle preferably between five and twenty degrees, for example seven and a half degrees. These slants may be sufficient for the spoke to avoid the other flange. During advance, the spokes are preferably presented in a position such that their curved head 48 is turned slightly to the side so as to allow rotation of the spoke under the effect of its own weight after introduction in the hole.

The operation of the device is the following: after positioning a hub 3 on the brake support 2, the positioning head 12 is lowered so as to bring the needle 9 into the zone comprising holes 7, studs 23 and 24 coming into contact with the edge 25 of flange 6. The path of the positioning head then curves, the needle following the ring comprising holes 7. As soon as cell 31 detects the presence of a first hole 29, jack 13 causes needle 9 to be inserted into this hole; the further thrust of jack 14 causes hub 3 to rotate against the braking torque produced by the brake support 2. This rotation stops when cone 19 is engaged in housing 20, needle 9 and hole 29 being then in the reference position 27. Jack 13 is then actuated in the reverse direction to withdraw needle 9, and jack 14 causes the positioning head 12 to rise again so as to free the space and allow the insertion of the spokes. Then the spoke feed and guide devices are advanced, the spokes being introduced one after the other, in the succession of the following phases:

advance of devices 40 and 42 to bring them close to the right-hand flange 6, introduction of the spokes corresponding to the lower hole 41 and then to the upper hole 43, retraction of devices 40 and 42; the spokes, generally retained by the opposite devices after passing through the flange, fall under the effect of their own weight; this retraction further frees the space for advancing devices 44 and 46;

advance of devices 44 and 46 to bring them close to the left-hand flange 5, introduction of the spokes corresponding to the lower hole 45 then to the upper hole 47, retraction of devices 44 and 46.

Positioning of the elements such as insertion of the spokes will preferably take place in a descending zone of the flanges, that is to say situated on the same side with respect to the vertical plane containing the shaft 4 of the hub. Thus, insertion may be provided in the first upper quarter of the flange, the spokes, after insertion, swinging reversely with respect to shaft 4 under the effect of their weight.

Some hubs comprise boring irregularities and more especially a lack of registration of the holes in the right-hand 6 and left-hand 5 flanges. In this case, the corresponding holes, for example holes 45 and 41, are not opposite each other. For adapting two hubs having this defect, the present invention provides means for adjusting the relative positioning of the hub and of the feed and guide devices 42 and 41 for threading spokes in the second left-hand flange 5. In fact, positioning of the hub being detected with respect to the right-hand flange 6 by needle 9, it is necessary to adjust the relative position of the hub and of the guide devices during insertion of the spokes into the left-hand flange 5.

In a first variation, devices 44 and 46 are disposed on oscillating means allowing them to rotate about the axis of symmetry of the hub, as shown by arrows 50 and 51. This rotation allows them to describe a part of the ring of flange 5 comprising the holes, so as to accommodate the offset between the holes in the two flanges. Automation of the adjustment is achieved by providing drive means for rotatably actuating the oscillating means, sensors 52 for detecting the presence of a hole in the second flange 5 in the alignment of a guide device 44, and control means for causing the oscillating means to rotate when devices 44 and 46 are advanced for the first insertion of spokes into the second flange, and to prevent rotation when the spokes are opposite the corresponding holes, this position being maintained until all the spokes of the hub have been inserted.

In a second variation, the brake support 2 is driven by drive means 53 causing it to oscillate about the axis of symmetry of hub 3. A first solution consists in causing support 2 to oscillate permanently, or at least during the phase for introducing spokes into flange 5, with a sufficient amplitude so that the spokes may reach the desired holes. Then feed and guide devices 44 and 46 are provided for causing the spoke to advance and for holding it in abutment against flange 5 until a hole is presented allowing its passage. This solution only allows boring irregularities of small value to be compensated for, so as not to compromise the speed of the machine.

In the case of boring irregularities of high values, for example corresponding to offsets of ten to thirty degrees, it is preferable to adopt a second solution: a jack and drive means 53 produce the oscillation and locking of support 2 in this case drive means 53 operates as a brake; during threading of the first spoke into flange 5, the support is caused to oscillate, the spoke being held in abutment against the flange, until the spoke penetrates into the hole; a detector 54 signals the introduction of the spoke and causes locking of the support in position; control means memorize the position of the support; the second spoke is inserted, then the support is brought back to its initial position for the insertion of spokes in the right-hand flange 6. At each threading of the spokes into the left-hand flange 5, support 2 is brought back to the memorized position, during the advance of devices 44 and 46, and the support is brought back to its initial position after threading.

In the preceding embodiment, the hub is driven by a needle engaging in one of the holes of the flange. Thus, one of the holes may be brought accurately into a predetermined position, in which position the first spoke will be threaded without difficulty. However, threading of the other three spokes in the other holes may sometimes prove delicate, particularly if the flanges have boring irregularities, defects which are relatively frequent. To succeed in threading the spokes in this case, the preceding embodiment leads to a relatively complex device, requiring numerous adjustments.

Figure 8:
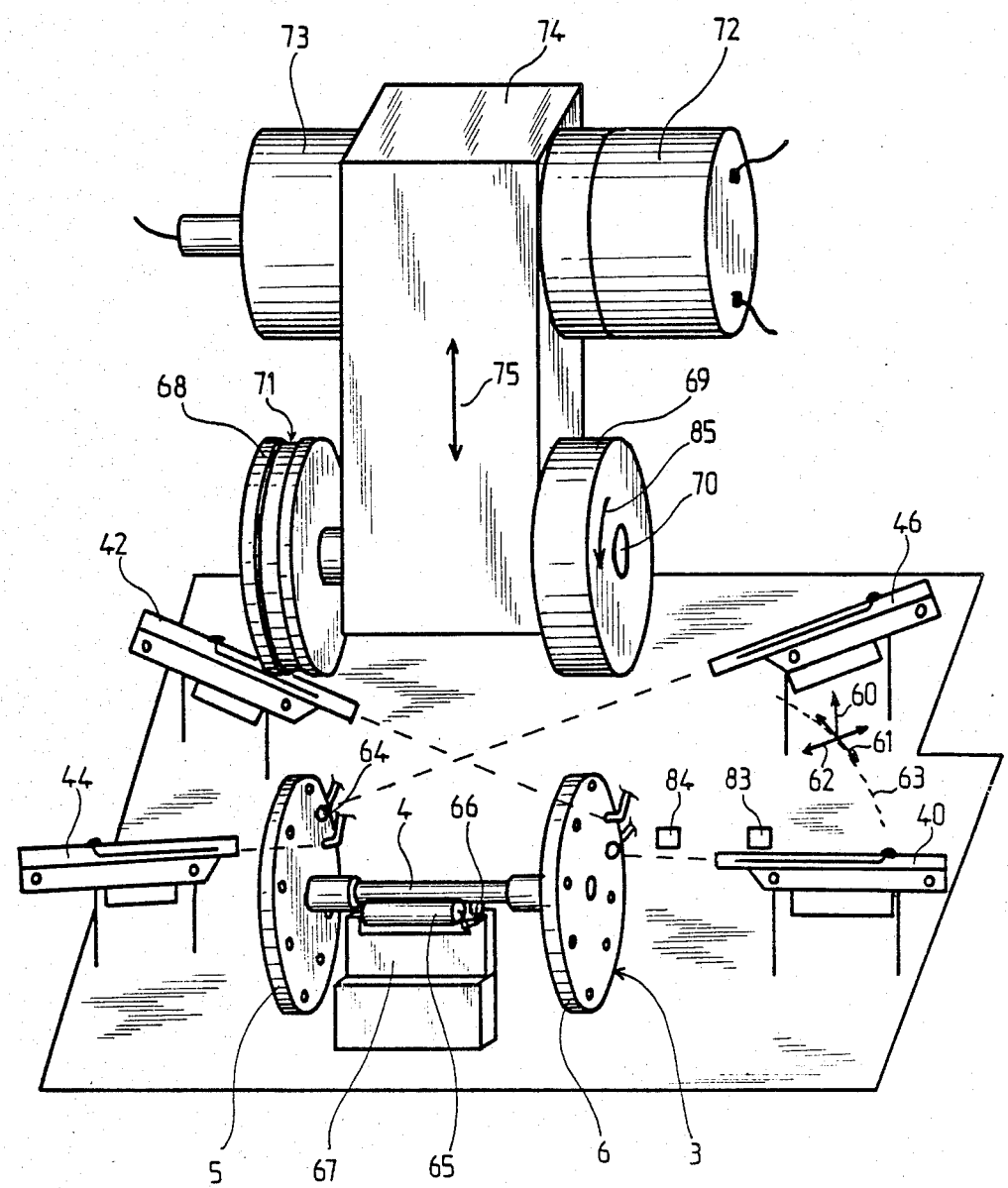
FIG. 8 shows schematically a perspective view of the device of the present invention according to a second embodiment.

The following embodiment may be preferred, allowing a device to be designed both simple and reliable. In the second embodiment, shown in FIGS. 8 and 9, the guide devices 40, 42, 44 and 46 are disposed as in the preceding embodiment, in fixed adjustable positions; their adjustment may be made in several directions, as shown in FIG. 8 in relation with guide device 46: a vertical direction 60, a transverse direction 61, an axial direction 62. For adapting to different flange dimensions, and particularly to assymmetrical hubs, it may be necessary to provide an additional rotational adjustment, as shown by the broken line curve 63, in rotation about the mean point 64 of introduction of the corresponding spoke.

In this second embodiment, hub 3 is disposed horizontally, its central shaft 4 resting longitudinally on two parallel horizontal rollers 65 and 66 mounted freely rotatable on a carriage 67. The lower rollers 65 and 66 are of a length less than the length of shaft 4, as well as carriage 67, to totally free the lower zone of flanges 5 and 6 and allow the passage of the spokes mounted on the flanges.

Hub 3 is driven by two lower rollers 68 and 69, mounted on a horizontal shaft 70 parallel to shaft 4 of the hub, and bearing on each of the edges of flanges 5 and 6. The lateral surface of the first upper roller 68 is hollowed out to form a groove 71 partially surrounding the edge of flange 5 and forming a guide for maintaining hub 3 in an axial position. The second upper roller 69 is cylindrical, so that the device may be adapted without modification to hubs 3 of different lengths, the length of roller 69 accommodating the differences in length of the hubs. Rollers 68 and 69, integral with shaft 70, are rotated, through a toothed belt transmission not shown in the figure, by a motor 72 associated with angular position detection means 73. Motor 72, in this embodiment, also serves as brake for preventing rotation of the hub and compensating for the weight of the spokes inserted on the flanges. To avoid sliding, rollers 68 and 69 are coated with an adherent material such as rubber. The motor 72, rollers 68 and 69 and detection means 73 assembly is mounted on a carriage 74 vertically movable as shown by the double arrow 75 under the action of a jack not shown in FIG. 8. Under the action of this jack, rollers 68 and 69 press against flanges 5 and 6 to rotate them or brake them or are raised to free the hub and allow its replacement.

Figure 9:
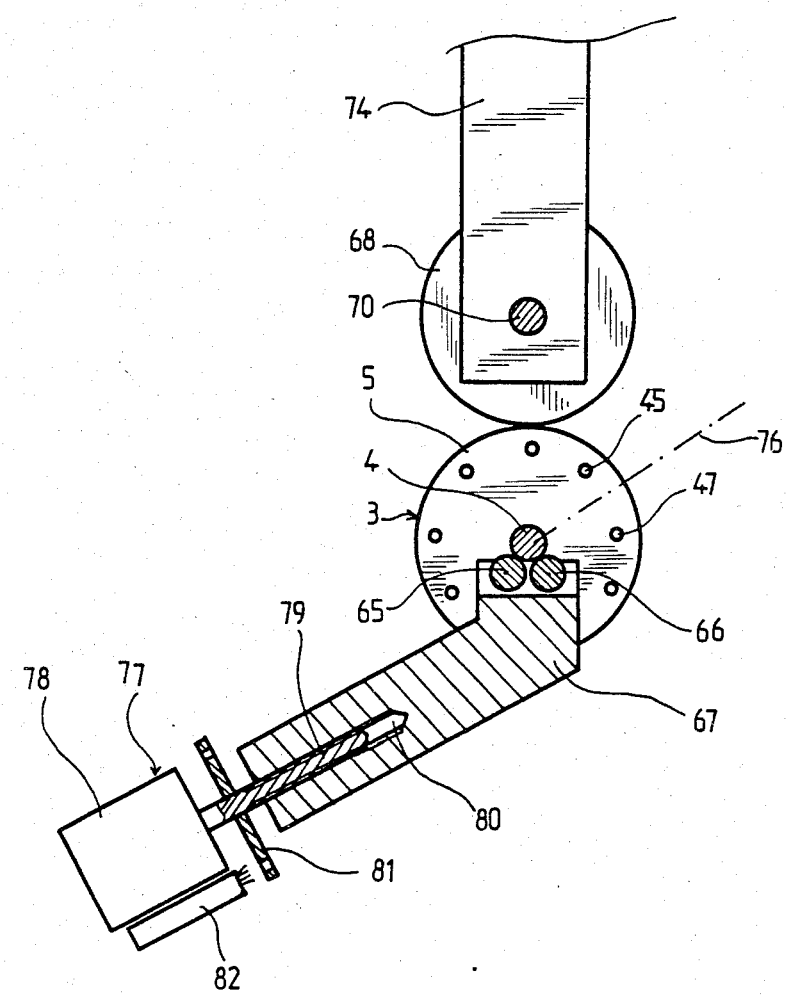
FIG. 9 shows schematically a cross sectional view of the hub supporting device in this second embodiment.

In FIG. 9, the mounting of hub 3 on carriage 67 has been shown in cross section. In a more elaborate embodiment carriage 67 is movable in translation along an axis 76 substantially parallel to the mean bisecting plane of the zone in which the spokes are inserted in the hub. By mean bisecting plane is meant the plane passing through shaft 4 of the hub and intersecting the spoke insertion zone at the middle thereof, the insertion zone being for example the zone in which the four spokes are inserted one after the other, only spokes 45 and 47 being shown in FIG. 9. Carriage 67, movable in direction 76, is actuated by a jack 77. Since the movements of carriage 67 must be relatively small and accurate, an electric jack will be used preferably, formed by an electric motor 78 whose stub shaft 79 is threaded and engaged in a tapped bore 80 formed in carriage 67. A perforated disk 81, integral with shaft 79, associated with a hole counting and detection device 82 allows the position of carriage 67 to be controlled with precision. It will in particular be noted that the angular position detecting device 73 may be formed in the same way, by a perforated disk such as disk 81 and a device such as 82.

The operation of the device is the following: The guide devices 40, 42, 44 and 46 are initially positioned in a position such that the insertion of the four spokes may take place, in one hub without boring defect, without rotating this hub, that is to say that if a first spoke can be inserted in a hole, the other three must be able to be inserted also. A hub 3 is positioned on rollers 65 and 66; carriage 74 is lowered so that rollers 68 and 69 bear on the edges of hub 3; a first guide device 40 causes a spoke to advance. A first position detector 83, associated with the device 40, detects the passage of the corresponding spoke if it is introduced normally into the hole of flange 6. If it is not introduced immediately, if the spoke remains in abutment against the flange, sensor 83, in association with first timing means not shown in the figure, produces a signal for controlling the rotation of motor 72; hub 3 is then rotated about its mean position, which tends to bring a hole opposite the spoke. The spoke then penetrates into the hole and sensor 83, detecting the passage of the spoke, causes motor 72 and hub 3 to be locked. Should the spoke not be introduced despite the rotational movement, there is further provided a translational movement of carriage 67 by controlling motor 78 and, by combining these two movements, a hole is sought in the surface situated in the vicinity of the point of contact of the spoke on the flange.

It will be noted that a second position sensor 84 may be disposed in front of the first sensor 83, as shown in the figure, and associated with second timing means, for detecting the jamming of a spoke at the outlet of the guide device 40. Thus, incomplete insertion of the spoke is detected. It can be seen that in this case the spoke may be easily loosened by subjecting it to jerks in the direction of its advance, caused by the device for thrusting the spoke integral with guide device 40. The thrust device is then controlled by sensor 84.

During the translational movements of carriage 67 under the action motor 78, it is necessary to compensate for the movement of the carriage by a slight vertical movement of rollers 68 and 69. This vertical movement may be obtained by mounting carriage 67 on an actuating jack with interposition of a spring, this spring further maintaining a flexible contact of rollers 68 and 69 on flanges 5 and 6.

In general, the hubs have holes spaced apart relatively evenly on the periphery of the flanges. In this case the threading of the spokes is appreciably speeded up in the following way: after the first four spokes have been threaded, for which it was necessary to search for the position of the first hole, a rotation is imparted to the hub equal to twice the angular pitch between two holes, through the detecting means 73, in the direction of arrow 85 in FIG. 8. The first free hole following the spoke filled holes is thus brought facing the first guide device 40, and the introduction of the next four spokes may take place without an additional rotation of hub 3 and without translation of carriage 67.

The present invention is not limited to the embodiments which have been explicitly described, but it includes the different variations and generalizations thereof contained in the scope of the following claims. Thus, the description was made with respect to embodiments allowing the simultaneous insertion of four spokes, but embodiments may of course be provided for the insertion of two spokes or six spokes for example for each rotation of the hub. Furthermore, the upper rollers 68 and 69 may be of different diameters, so as to be adapted to flanges 5 and 6 of different diameters. In this case, it is necessary to separate rollers 68 and 69 so as to allow different rotational speeds, for example by mounting one of the two rollers freely rotatable on shaft 70 or by any other means.

I claim:

1. A method for threading spokes into holes provided in flanges of spoke wheel hubs, each flange having corresponding holes, comprising the following steps:
    disposing the hub (3) horizontally and braking its rotation with braking means producing a braking torque greater than the drive torque produced by the weight of spokes when mounted on the hub;
    rotating the hub by drive means (9) to bring a first hole (29) of the hub into a predetermined position (27) for insertion of a first spoke thereinto;
    threading a spoke into each of the corresponding holes of each flange in predetermined directions so that they pass to the side of the other flange, and after introduction, letting them hang under the action of their own weight;
    rotating the hub and bringing the next first free hole into the predetermined position (26);
    continuing with threading spokes and rotating the hub until all the spokes are introduced; and
    removing the hub fitted with spokes.

2. The method according to claim 1, characterized in that, during the threading step, the spokes are introduced into a descending zone of the hub so that after threading the spokes pile up above each other under the action of their weight.

3. The method according to claim 1, characterized in that, during the threading step, the first lower hole (41) then the upper hole (43) of the first flange (6) are fitted with spokes, followed by the lower hole (45) and the upper hole (47) of the second flange (5).

4. The method according to claim 1, characterized in that the braking means produce a continuous braking torque, each rotation of the hub being ensured by introduction of a drive needle into a hole, rotation by the needle against the braking torque, withdrawal of the needle.

5. The method according to claim 1, characterized in that it comprises a step for searching for the position of each hole, comprising the following phases:
    positioning the hub in a spoke introduction zone;
    advancing the first spoke in the direction of the flange;
    detecting the passage of the spoke in the hole; if the introduction is complete, advancing the next spoke; if the spoke is engaged in the hole but with incomplete introduction after a predetermined period, subjecting the spoke if need be to jerks for loosening it; if the spoke is still not engaged in the hole after a predetermined time, but remains in abutment against the flange, maintaining the spoke in abutment and causing movements of the hub about its mean position until the spoke is introduced, and locking the hub in the position for spoke introduction.

* * * * *